United States Patent
Müller et al.

(10) Patent No.: US 6,349,936 B1
(45) Date of Patent: Feb. 26, 2002

(54) DEVICE FOR MEASURING THE HEIGHT OF A SHEET PILE BY USING A REFLECTIVELY OPERATING RADIATION DETECTOR

(75) Inventors: Tobias Müller, Hirschberg; Thomas Wolf, Karlsruhe, both of (DE)

(73) Assignee: Heidelberger Druckmaschinen, Heidelberg (DE)

( * ) Notice: Subject to any disclaimer, the term of this patent is extended or adjusted under 35 U.S.C. 154(b) by 0 days.

(21) Appl. No.: 09/609,606

(22) Filed: Jul. 5, 2000

(51) Int. Cl.⁷ .............................. B65H 7/02; B65H 1/16
(52) U.S. Cl. .................... 271/265.01; 271/155; 271/14; 73/646; 378/20
(58) Field of Search ................................ 271/152, 154, 271/155, 265.01, 31, 14, 11; 378/20; 73/646

(56) References Cited

U.S. PATENT DOCUMENTS

| | | | |
|---|---|---|---|
| 4,345,247 A | * | 8/1982 | Thornton et al. .............. 73/646 |
| 5,307,273 A | * | 4/1994 | Oh et al. ....................... 73/646 |
| 5,600,133 A | * | 2/1997 | Spillman ....................... 73/646 |

FOREIGN PATENT DOCUMENTS

| | | | |
|---|---|---|---|
| DE | 1189088 | 3/1965 | |
| DE | 4227814 A1 | 2/1993 | |
| DE | 4406525 C2 | 10/1996 | |
| GB | 2195616 A | * 4/1988 | .................. 271/155 |
| JP | 405097278 A | * 4/1993 | ............ 271/265.01 |
| JP | 406100200 A | * 4/1994 | .................. 271/155 |

\* cited by examiner

*Primary Examiner*—H. Grant Skaggs
(74) *Attorney, Agent, or Firm*—Herbert L. Lerner; Laurence A. Greenberg; Werner H. Stemer

(57) ABSTRACT

A device for measuring the height of a sheet pile by using a reflectively operating radiation detector, a sheet separating device and a device for conveying separated sheets to a printing machine being assigned to the pile, comprising a system for measuring the propagation time of a radiation pulse originating from a radiation source and reflected at a sheet surface, the amplitude of the pulse being within a predefined range and lower than the amplitude of the reflection of the same radiation pulse at the surface of the sheet located closest to the radiation source, the radiation detector being connected to the measuring system.

4 Claims, 1 Drawing Sheet

DEVICE FOR MEASURING THE HEIGHT OF A SHEET PILE BY USING A REFLECTIVELY OPERATING RADIATION DETECTOR

BACKGROUND OF THE INVENTION

Field of the Invention

The invention relates to a device for measuring the height of a sheet pile by using a reflectively operating radiation detector.

In printing machines, adjustable-height pile tables for sheets are used which, with a lifting device, guide the sheet pile to a separating or singling device. The lifting device is controlled with the aid of measuring arrangements for measuring the height of the uppermost, stationary sheet. In order to assist in the separation, the uppermost sheets are loosened by blown or blast air. The requirements for detecting the height of the pile are thereby made more difficult. The separated sheets are conveyed on a feeder table and fed to the printing machine. As a rule, a great number of constructional elements of the feeder table, the lifting device or equipment for refilling the pile are provided around the pile. Consequently, the options for positioning height detectors are restricted.

The published German Patent Document DE 42 27 814 A1 shows a sheet feeder for a sheet printer, wherein the condition of loosening of the upper part of a pile is registered by two opto-electronic separation-condition detectors, a measurement light beam of which impinges on the pile from above. The detector signals are used to determine the number of floating sheets, by which a separation air flow is controlled.

SUMMARY OF THE INVENTION

It is accordingly an object of the invention is to provide a device for measuring the height of a sheet pile which, during the continuous separating operation, permits the height measurement signals to be determined with detectors which are disposed above the pile.

With the foregoing and other objects in view, there is provided, in accordance with the invention, a device for measuring the height of a sheet pile by using a reflectively operating radiation detector, a sheet separating device and a device for conveying separated sheets to a printing machine being assigned to the pile, comprising a system for measuring the propagation time of a radiation pulse originating from a radiation source and reflected at a sheet surface, the amplitude of the pulse being within a predefined range and lower than the amplitude of the reflection of the same radiation pulse at the surface of the sheet located closest to the radiation source, the radiation detector being connected to the measuring system.

In accordance with another feature of the invention, the radiation source is a sound source.

In accordance with a first alternative feature of the invention, the radiation source is a source for emitting X-rays.

In accordance with a second alternative feature of the invention, the radiation source is a source for emitting a particle beam.

According to the invention, radiation sources, in particular sound sources or radiometric radiation sources which are in pulsed operation are used. Part of the energy of a radiation pulse impinging on the top of the pile is reflected at the uppermost sheet or at a sheet which has just been separated and is being conveyed onward, while a further part of the energy passes through the sheet and is propagated in the direction of the sheet located underneath. The reflection and transmission of radiation energy continue with decreasing intensity on the sheet located underneath. The radiation detector picks up the radiation energy reflected by the sheets. The radiation-detector signals are fed to a system for measuring the propagation time. It is possible for the height of the pile to be derived from the propagation time of the radiation pulse reflected at the uppermost fixed sheet.

The system for measuring the propagation time can be constructed so that the stronger echoes from the outgoing top sheets are filtered out, and only the echoes from the sheets located underneath are evaluated. The transmitting power for the angled arrangement of transmitter and receiver for the radiation is selected so that the weaker echo can also be picked up well.

The sensing location for the radiation detector can preferably be selected at the top of the pile, in the vicinity of the leading or front edge thereof. It is of course possible for a number of radiation detectors to be provided over the format width of the pile, in order to be able to detect curvatures or waves in the pile surface.

Other features which are considered as characteristic for the invention are set forth in the appended claims.

Although the invention is illustrated and described herein as embodied in a device for measuring the height of a sheet pile by using a reflectively operating radiation detector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
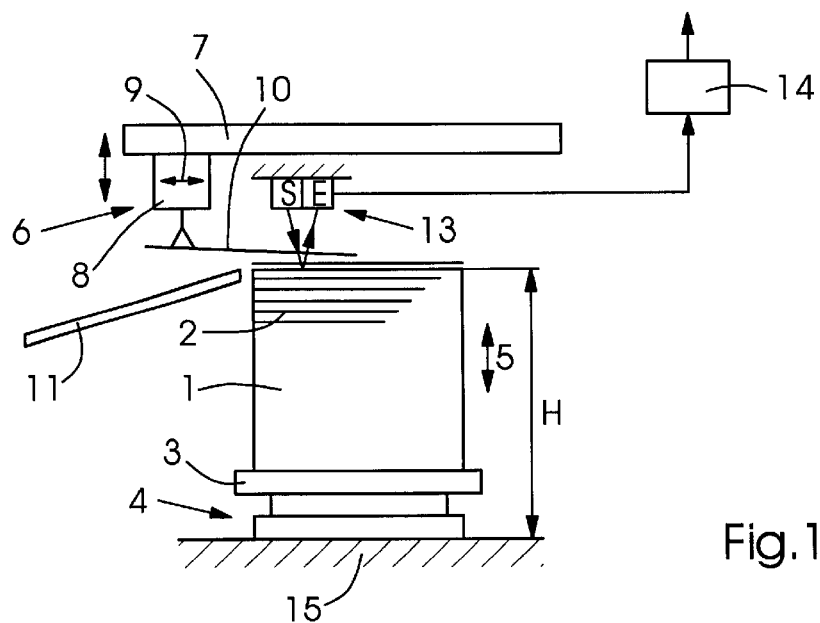
FIG. 1 is a schematic and diagrammatic view of a sheet feeder with a device according to the invention for measuring the height of a sheet pile.

Referring now to the figures of the drawings and, first, particularly to FIG. 1 thereof, there is shown therein diagrammatically parts of a feeder of a sheet-fed printing machine. A pile 1 with sheets 2 to be printed has been built up on a pile board 3. The pile board 3 is located on a lifting device 4 for lifting or lowering the pile 1 in a vertical direction represented by the double-headed arrow 5 for suitably positioning the pile 1. Located above the pile 1 is a sheet separating or singling device 6. The separating device 6 includes an adjustable-height cross member 7 and a suction head 8, which is guided in the horizontal direction 9 on the cross member 7. The separating device 6 is used for the separation and for the onward transport of the respective sheet 10 located at the top in the direction of a feeder table 11. In order to determine the current height H of the uppermost sheet 12, an ultrasonic detector 13 with a transmitter S and a receiver E is provided above the pile 1. The ultrasonic detector 13 is connected to a device 14 for measuring propagation time. From the propagation times of ultrasonic pulses, determined in the device 14, the measured signal H for the height of the pile 1 above the ground 15 is derived and fed to a non-illustrated control device which serves to keep the separating device 6 and the pile 1 continuously at an optimum working height.

Figure 2:
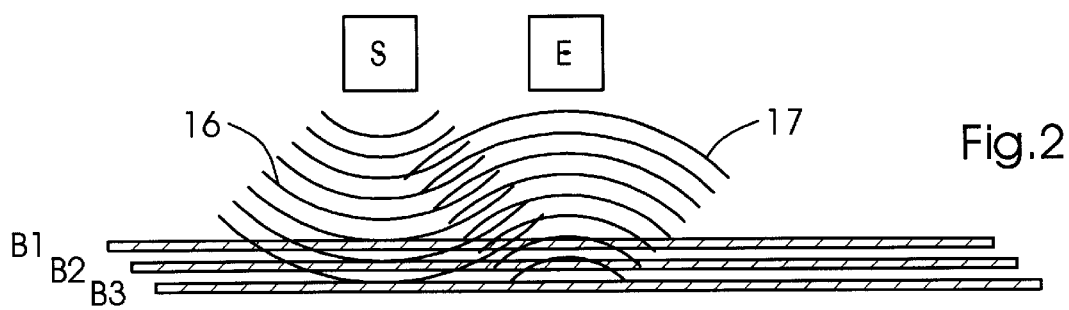
FIG. 2 is a schematic diagram depicting the manner of operation of an ultrasonic detector.
Figure 3:
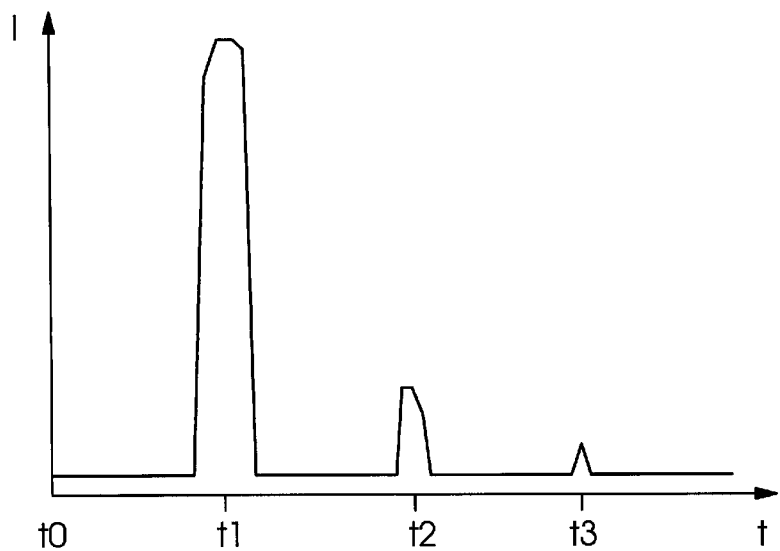
FIG. 3 is plot diagram showing the pulses at the output of a radiation receiver.

With reference to FIGS. 2 and 3, there is described hereinafter how the height measurement of the pile 1 takes place. The wavefronts 16 of a sound pulse originating from the transmitter S arrive in the upper region of loose-lying sheets of the pile 1. In FIG. 2, the sheets B1 and B2 are in this region that is produced by a blowing or blast device. The sheet B3 is assumed to be the first sheet 2 still located firmly on the pile 1. The wavefronts 16 are reflected strongly at the sheet B1, weakly at the sheet B2 and very weakly at the sheet B3. If the wavefronts 16 were emitted at a time $t_0$, then the echo from the sheet B1 appears at the receiver E after a time $t_1$, the weaker echo 17 from the sheet B2 appears after a time $t_2$, and the weakest echo 17 from the sheet B3 appears after a time $t_3$. From the known speed of propagation of sound, the distances of the sheets B1, B2 and B3 from the ultrasonic detector 13 can be calculated from the propagation times $(t_1-t_0)$, $(t_2-t_0)$, and $(t_3-t_0)$.

We claim:

1. A device for measuring the height of a sheet pile by using a reflectively operating radiation detector, a sheet separating device and a device for conveying separated sheets to a printing machine being assigned to the pile, comprising a system for measuring the propagation time of a radiation pulse originating from a radiation source and reflected at a sheet surface, the amplitude of said pulse being within a predefined range and lower than the amplitude of the reflection of the same radiation pulse at the surface of the sheet located closest to the radiation source, said radiation detector being connected to said measuring system.

2. The device according to claim 1, wherein said radiation source is a sound source.

3. The device according to claim 1, wherein said radiation source is a source for emitting X-rays.

4. The device according to claim 1, wherein said radiation source is a source for emitting a particle beam.

* * * * *